US007664256B2

(12) United States Patent
Takei

(10) Patent No.: US 7,664,256 B2
(45) Date of Patent: Feb. 16, 2010

(54) MOBILE TERMINAL APPARATUS

(75) Inventor: Yutaka Takei, Tokyo (JP)

(73) Assignee: Sony Corporation, Tokyo (JP)

( * ) Notice: Subject to any disclaimer, the term of this patent is extended or adjusted under 35 U.S.C. 154(b) by 592 days.

(21) Appl. No.: 11/304,648

(22) Filed: Dec. 16, 2005

(65) Prior Publication Data

US 2006/0139898 A1 Jun. 29, 2006

(30) Foreign Application Priority Data

Dec. 27, 2004 (JP) ............................. 2004-377888

(51) Int. Cl.
H04M 1/00 (2006.01)
H04M 9/00 (2006.01)
(52) U.S. Cl. ........................... 379/433.07; 379/433.01; 455/550.1
(58) Field of Classification Search ............ 379/428.01, 379/434, 433.07, 433.06, 433.13, 433.01; 455/550.1, 575.1, 575.4, 575.3, 90.2, 90.3; 200/5 A, 5 R, 9, 237, 265–269, 275, 308, 200/310, 314, 341, 345, 412, 417, 510, 512, 200/515–517, 520, 600
See application file for complete search history.

(56) References Cited

U.S. PATENT DOCUMENTS 4,937,408 A * 6/1990 Hattori et al. ............... 200/314
6,011,699 A * 1/2000 Murray et al. ............... 361/814
6,396,923 B1 * 5/2002 Kitamura et al. ........ 379/433.01
6,681,125 B1 * 1/2004 Woo ......................... 455/556.1
7,016,704 B2 * 3/2006 Pallakoff .................... 455/566
7,071,916 B2 * 7/2006 Duarte et al. ............... 345/156
7,187,364 B2 * 3/2007 Duarte et al. ............... 345/168
2003/0153284 A1 * 8/2003 Minami et al. ............... 455/90
2004/0005916 A1 * 1/2004 Choi ........................ 455/575.3
2006/0111160 A1 * 5/2006 Lin et al. .................. 455/575.3
2008/0194299 A1 * 8/2008 Cho et al. ................... 455/566

FOREIGN PATENT DOCUMENTS

JP 11-112627 4/1999

* cited by examiner

Primary Examiner—Curtis Kuntz
Assistant Examiner—Phylesha Dabney
(74) Attorney, Agent, or Firm—Oblon, Spivak, McClelland, Maier & Neustadt, L.L.P.

(57) ABSTRACT

Disclosed is a mobile terminal apparatus which includes: an upper housing in which a display portion having a display screen is disposed; a lower housing having an inner major surface in which an operating portion including a plurality of kinds of input keys is disposed; and a connecting portion which connects the upper housing with the lower housing such that the upper housing and the lower housing are turnable away from and toward each other to open and close the apparatus. In this apparatus, the inner major surface of the lower housing is recessed at an area where input keys of a first group that corresponds to a particular one of the kinds is disposed, so as to increase a level difference between a keytop of each of the input keys of the first group and the inner major surface.

14 Claims, 4 Drawing Sheets

FIG.1A
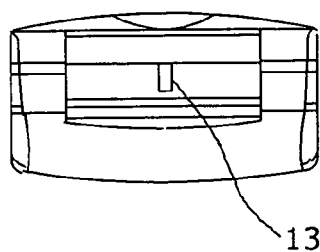
FIG.1B     FIG.1C     FIG.1D
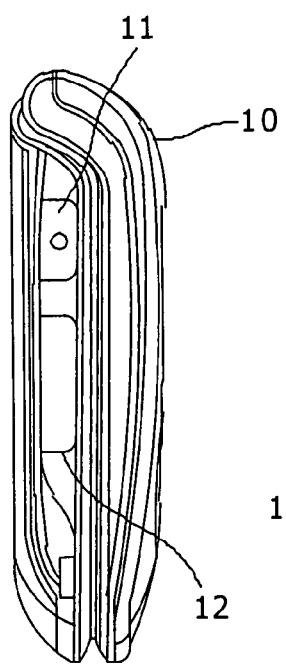 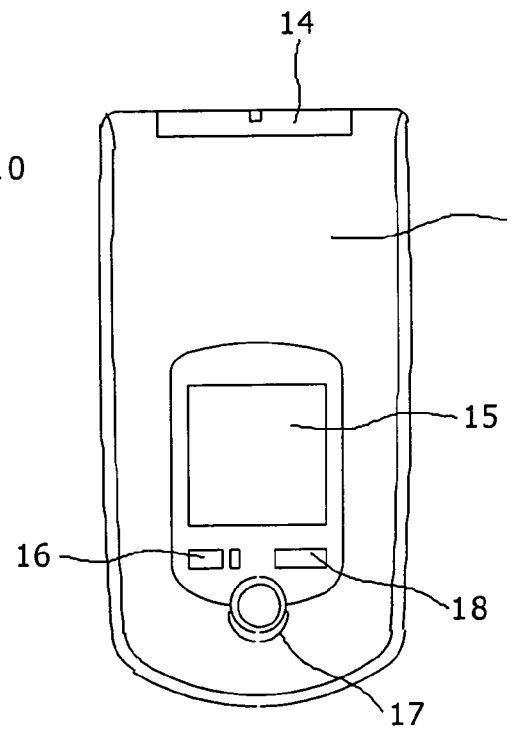 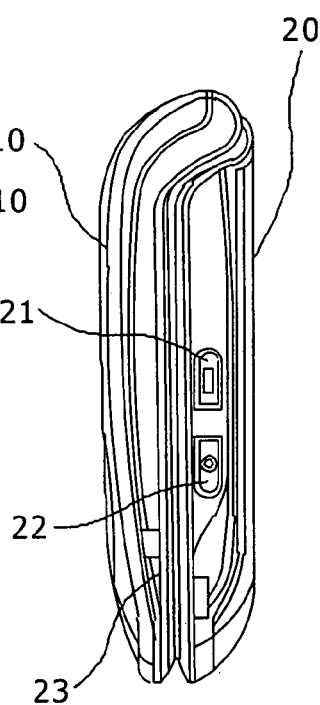
FIG.1E

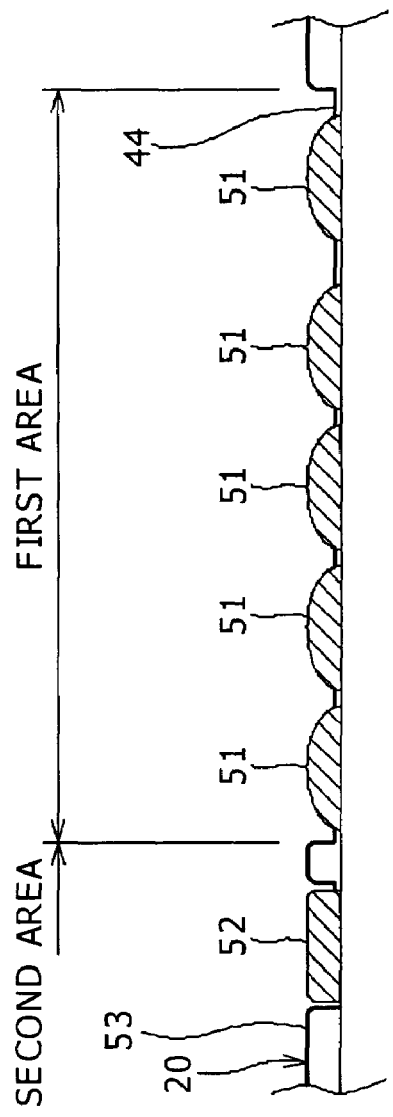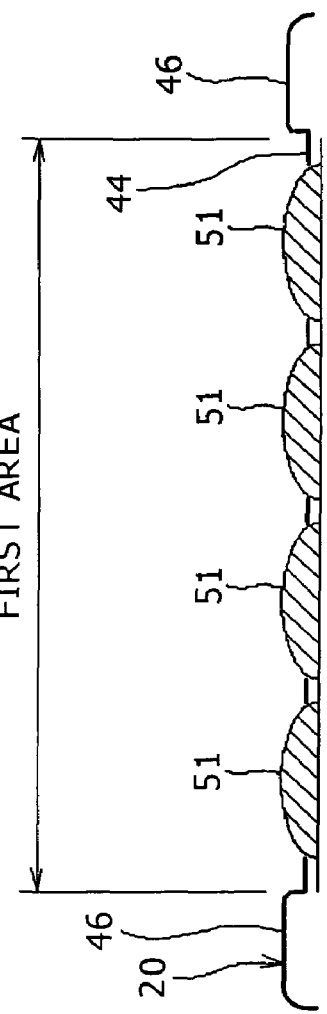

MOBILE TERMINAL APPARATUS

CROSS REFERENCES TO RELATED APPLICATIONS

The present invention contains subject matter related to Japanese Patent Application No. 2004-377888 filed in the Japanese Patent Office on Dec. 27, 2004, the entire contents of which being incorporated herein by reference.

BACKGROUND OF THE INVENTION

1. Field of the Invention

The present invention relates to a mobile terminal apparatus, and more particularly to a structure of a mobile terminal apparatus having an upper housing and a lower housing that are connected to each other such that the upper and lower housings are relatively displaceable away from and toward each other to open and close or fold the mobile terminal apparatus.

2. Description of the Related Art

Typically, a mobile terminal apparatus (hereinafter simply referred to as "terminal") of fold type or clamshell type, such as mobile phone terminal of the type, includes an upper housing, a lower housing, and a hinge portion that connects the upper and lower housings such that the upper and lower housings are turnable about the hinge portion away from and toward each other so that the terminal is openable and closable or foldable. The upper housing has a display screen on an inner major surface thereof, and the lower housing has on an inner major surface thereof an operating portion including various input keys. Fold-type terminals are widely used these days because of their advantages that the screen and key area of the terminals are wide when used, and the terminals are compact when closed to be carried.

When closed or folded, an operating portion of such a fold-type terminal is opposed to a display screen in the form of a transparent plate. A thickness of the terminal becomes inevitably larger when the terminal is folded than when the terminal is not folded, since the upper housing is superposed on the lower housing in the folded state of the terminal. To minimize the thickness of the terminal as folded, it is desirable to minimize a clearance between the upper and lower housings as superposed on each other, in addition to reduce a thickness of each of the upper and lower housings. However, contact of any of the input keys with the display screen leads to contamination or damage of the display screen. When an input key excessively protrudes from the inner major surface, that input key may be unintentionally pressed upon deformation of one or both of the upper and lower housings, thereby causing a false operation of the terminal.

In a common remote controller for a television set or an audio system, input keys or manual operation buttons are disposed in a surface of the remote controller to protrude therefrom to facilitate operation or pressing thereof by a user.

However, in the fold-type terminal, the keytops of the input keys are substantially flush with the surface in which the input keys are disposed, for the above-described reason. The shape of the keytop of each of the input keys is substantially flat, so as not to form a clearance around each input key. As described above, it is difficult to form the keytop in a rounded shape.

Usually, to alleviate an impact imposed on the upper and lower housings upon folding of the terminal with a clearance left between the upper and lower housings, a shock-absorbing member such as that of rubber is disposed at an end portion of the inner surface of one or both of the upper and lower housings. Increasing a height of the shock-absorbing member allows the input keys to further protrude from the surface in which the input keys are disposed. However, the clearance between the upper and lower housings while the terminal is folded or closed increases with an increase in the amount of the protrusion, or the height, of the input keys, thereby increasing the thickness of the terminal as folded, while making the terminal prone to introduce dust and dirt into the clearance.

JP-A-11-112627 discloses a mechanism in a fold-type mobile terminal having an upper housing and a lower housing, which mechanism is configured such that an operating portion thereof is retracted into the lower housing when the upper and lower housings are turned toward each other, that is, the terminal is folded or closed, and the operating portion comes out of the lower housing when the upper and lower housings are turned away from each other, that is, the terminal is opened.

According to the terminal disclosed in the above-mentioned publication, the usability of the operating portion is enhanced by the mechanism, in exchange for increases in the complexity of the mechanism and the cost of the terminal. Further, although a clearance formed between the upper and lower housings when the terminal is folded can be made relatively small, a space for allowing movement of input keys in a direction of a thickness of the lower housing is necessary in the lower housing, and thus it is inevitable that the thickness of the lower housing is relatively large.

SUMMARY OF THE INVENTION

The present invention has been developed in view of the above-described situations. According to one embodiment of the invention, there is provided a mobile terminal apparatus which has an upper housing and a lower housing that are connected to be turnable away from and toward each other so that the apparatus is openable/closable, and is configured to have a reduced thickness when closed, and exhibit an enhanced usability of input keys disposed in one of the upper and lower housings, i.e., an enhanced easiness in manipulating the input keys, without any input key contacting a surface of the other of the upper and lower housings that is opposed to the input keys.

That is, another embodiment of this invention is directed to a mobile terminal apparatus that includes: an upper housing in which a display portion having a display screen is disposed; a lower housing having an inner major surface in which an operating portion including a plurality of kinds of input keys is disposed; and a connecting portion which connects the upper housing with the lower housing such that the upper housing and the lower housing are turnable away from and toward each other to open and close the apparatus. The inner major surface of the lower housing is recessed at an area where input keys of a first group that corresponds to a particular one of the kinds is disposed, so as to increase a level difference between a keytop of each of the input keys of the first group and the inner major surface.

By this arrangement, the actual height of the input keys need not be changed in order to increase a level difference between the keytop of the individual input keys and the inner major surface of the lower housing. Thus, it is not necessary to change the absolute height of the input keys itself, thereby preventing an increase in the thickness of the terminal apparatus in the closed or folded state.

It is preferable that the keytop of each of the input keys of the first group is convex outward.

By this arrangement, convexity is provided to the input keys so that the user feels the convexity when manipulating the input keys. This facilitates distinguishing among the individual input keys by a finger. The present feature is particularly effective where the input keys are arranged close to one another.

According to another embodiment of the invention, the mobile terminal apparatus is adapted such that the inner major surface of the lower housing in which the operating portion is disposed is sectioned into a first area in which the input keys of the first group are disposed, and a second area constituted by an area other than the first area in the inner major surface, and input keys of a second group that corresponds to another of the kinds are disposed in the second area and the level of the inner major surface of the lower housing is higher at the second area than at the first area.

By this arrangement, each of a large number of input keys is disposed in either of the first and second areas that are visually and sensuously distinguishable, depending on the usage of the input key, thereby enhancing the easiness in manipulating the operating portion.

In the above-described arrangement, a keytop of each of the input keys of the second group is preferably substantially flush with a part of the inner major surface around the input keys of the second group. Preferably, each of the input keys of the second group has a keytop that is substantially flat.

Preferably, the inner major surface is configured such that two lateral end portions thereof on opposite sides of the first area are located at the same level as the second area.

According to this arrangement, the two lateral end portions reinforce the mechanical strength of the lower housing as well as prevent the input keys from contacting the display portion.

The mobile terminal apparatus may further include a shock-absorbing member disposed at an end portion in a surface of at least one of the lower housing and the upper housing, which surface is to be opposed to the other housing when the apparatus is closed. The end portion is remote from the connecting portion.

The shock-absorbing member functions to absorb an impact of contact between the upper and lower housings upon closing of the terminal apparatus, and to ensure a clearance between the upper and lower housings when the terminal apparatus is closed.

BRIEF DESCRIPTION OF DRAWINGS

Embodiments of the present invention will be described in detail based on the following figures, wherein:

FIGS. 1A, 1B, 1C, 1D and 1E are plan views of a fold-type mobile terminal apparatus according to one embodiment of the invention in a folded or closed state, as seen from the upper side, left side, front side, right side, and lower side, respectively;

FIGS. 4A and 4B are cross-sectional views respectively taken along line A-A and line B-B in FIG. 3A.

DETAILED DESCRIPTION OF THE PREFERRED EMBODIMENTS

Figure 2:
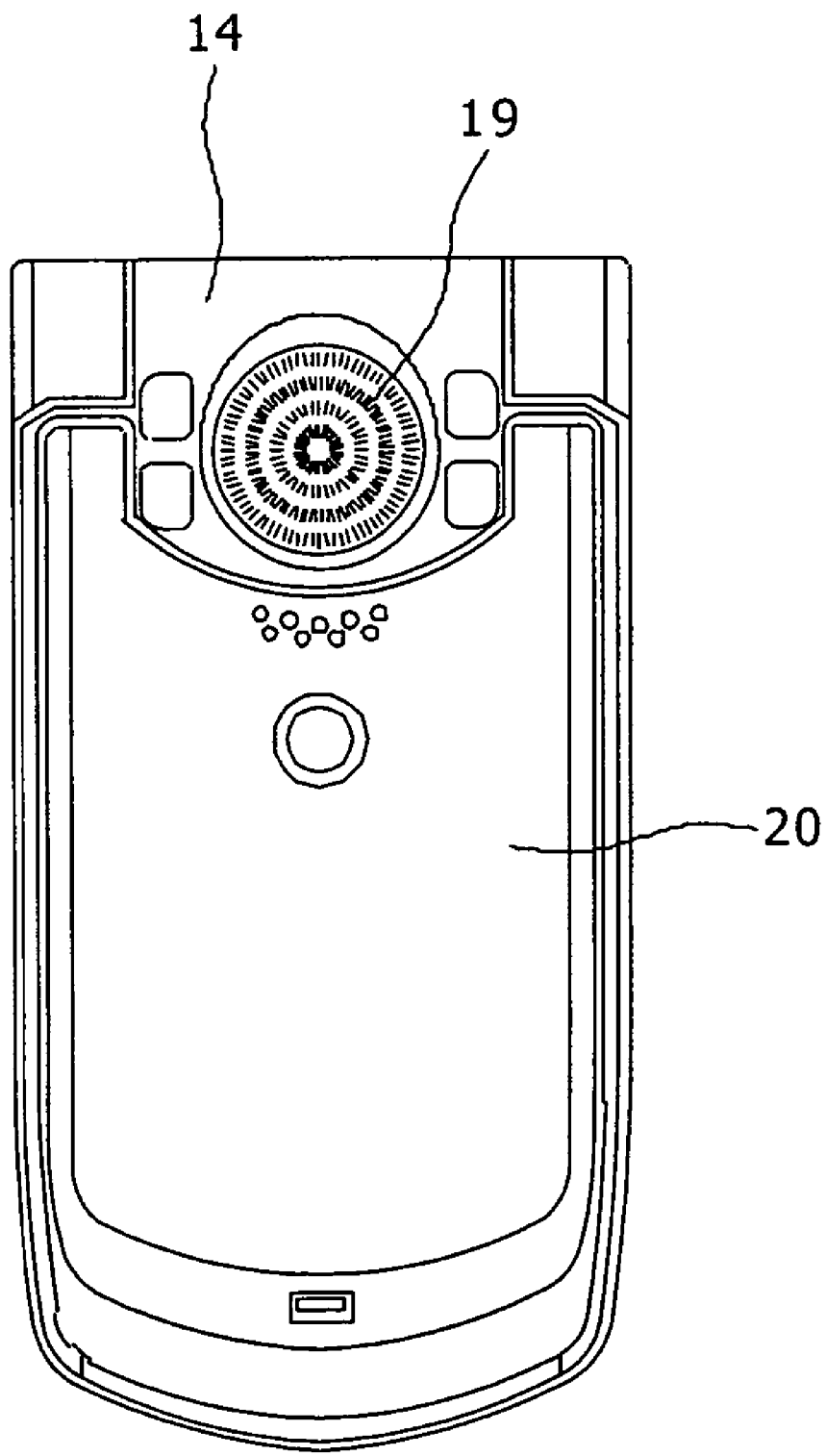
FIG. 2 is a plan view of the apparatus as seen from the back side.

Hereinafter, there will be described in detail a fold-type mobile terminal apparatus according to a presently preferred embodiment of the invention, by referring to the accompanying drawings.

FIGS. 1A-1E are plan views of the fold-type mobile terminal apparatus in the form of a mobile phone terminal in a folded or closed state, as seen from the upper side, left side, front side, right side, and lower side, respectively.

As shown in FIGS. 1A-1E, the present mobile phone terminal has an upper housing 10, a lower housing 20, and a connecting portion 14 in the form of a hinge arrangement that connects the upper housing 10 with the lower housing 20, such that the upper and lower housings 10, 20 are relatively turnable away from and toward each other to establish an open state and a closed or folded state of the terminal. As shown in FIG. 1C, a sub display 15, a picture light 16, a camera 17, and an infrared light 18 are disposed in an outer major surface of the upper housing 10. Also shown in FIG. 1A, an incoming/charge lamp 13 for indicating arrival of an incoming call or a mail message, as well as a fact that the charging is currently performed, is disposed in the connecting portion 14. Also shown in FIG. 1B, an earphone jack 11 and an external output terminal 12 are disposed on a left side of the lower housing 20. Also shown in FIG. 1D, a backlight key 21 and a camera mode key 22 are disposed on a right side of the lower housing 20. Similarly, a macro selector switch 23 for enabling close-up shots of the camera 17 is disposed on a right side of the upper housing 10.

FIG. 2 is a back side view of the terminal shown in FIGS. 1A-1E. That is, FIG. 2 is a plan view of the terminal in the folded state as seen from the side of a major outer surface of the lower housing 20. In the vicinity of the connecting portion 14, there is disposed a speaker 19 for outputting sounds such as ring alert up on arrival of an incoming call or mail message.

Figure 3A:
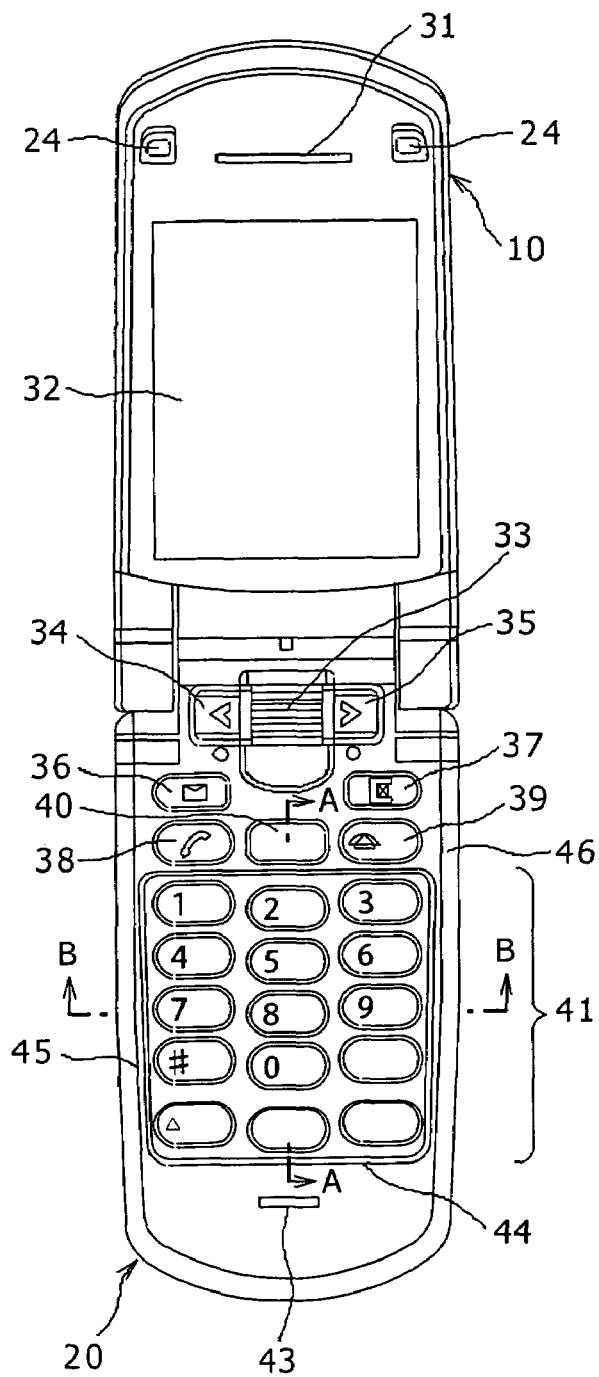
FIGS. 3A and 3B are a front side view and a right side view of the apparatus in an open state.
Figure 3B:
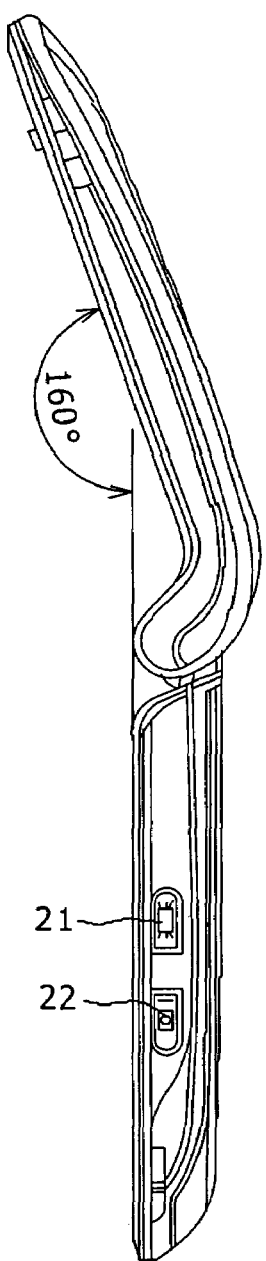

FIGS. 3A and 3B are a front side view and a right side view of the mobile terminal in the open state. The principle of the embodiment of the invention is best shown in FIG. 3A. As shown in FIG. 3B, when the terminal is in a fully open state, an angle of substantially 160 degrees is formed between an inner major surface of the upper housing 10 and an inner major surface of the lower housing 20, although not limited thereto.

Referring to FIG. 3A, a display 32 is disposed substantially at a center of the inner major surface of the upper housing 10, to extend across most of an area of the inner major surface. As such a display, a liquid crystal display or an organic EL display is typically employed. In the invention, however, any kind of display may be employed as the display 32. At each of both lateral marginal positions in an upper end portion of the inner major surface of the upper housing 10, there is disposed a shock-absorbing member 24 constituted by an elastic member such as that of rubber, to protrude from the inner major surface. The shock-absorbing members 24 serve to alleviate an impact imposed on the upper and lower housings 10, 20 when the terminal is abruptly folded, and to ensure a minimum clearance between the upper and lower housings 10, 20 when the terminal is folded. In the present embodiment, the clearance formed between the upper and lower housings when the terminal is folded is about 0.8 mm, and accordingly a height of each of the shock-absorbing members 24 as measured from the inner major surface of the upper housing is also about 0.8 mm. By this arrangement, the upper and lower housings 10, 20 do not directly contact each other in normal use. An ear receiver 31 from which sound is outputted during phone call is disposed at a center (i.e., substantially at a midpoint between the two shock-absorbing members 24) in the upper portion of the inner major surface of the upper housing 10.

In the vicinity of the connecting portion 14, there are disposed a center jog 33 as a kind of jog dial, and a left arrow key 34 and a right arrow key 35 on opposite lateral sides of the center jog 33.

At a first area in the inner major surface of the lower housing 20, which is located substantially at a center of the inner major surface, there is disposed alphanumeric keys or tenkey 41 which is included in input keys of a first group. At the entirety of the first area, the inner major surface of the lower housing 20 is slightly recessed from the other area in the inner major surface. That is, the inner major surface of the lower housing 20 has at the first area a portion lowered by about a few tenths of a millimeter to 1 or 2 millimeters. In this embodiment, the depth of the recess or the amount by which the inner major surface is lowered at the first area is substantially 0.3 mm. Each of the input keys disposed in the first area has a keytop surface that is curved to be convex outward, as will fully described later by referring to FIGS. 4A and 4B.

As input keys of a second group, a mail key 36, a web key 37, a start key 38, an on/off key 39, and a clear key 40 are disposed in a second area on the upper side of the first area in the inner major surface of the lower housing 20. The mail key 36 is manipulated when an electronic mail function is to be activated, the web key 37 is manipulated when a web browser function is to be activated, the start key 38 is manipulated when a telephone call or a communication is to be started, the on/off key 39 is manipulated when the terminal is to be powered on/off, and the clear key 40 is manipulated when an operation is to be cancelled or in like situations. Unlike at the first area, the inner major surface of the lower housing 20 is configured in the same manner as in the past at the second area. That is, a keytop of each of the input keys of the second group is substantially flush with a portion of the inner major surface of the lower housing 20 at the other area, i.e., the area other than the first and second areas. According to the present embodiment, the keytop of each input key of the second group is substantially flat. If the keytop is convex outward, a peripheral portion of the keytop is located at a lower level than the inner major surface to form a gap between a surface of the keytop and the inner major surface, in which gap dust and dirt will accumulate. According to the embodiment, however, such accumulation of dust and dirt is prevented. Nevertheless, the invention does not exclude an arrangement where the keytop of each input key in the second area is rounded or convex outward.

In the inner major surface, both lateral end portions 45, 46 at the sides of the first area are located at the same level as a portion 53 of the inner major surface of the second area. This configuration reinforces a mechanical strength of the lower housing 20, which is decreased by presence of a recess 44 or the lowered portion substantially at the center of the lower housing 20. Further, when at least one of the upper housing and the lower housing is deformed by an external pressure, and a degree of the deformation is more than that the upper housing is brought into contact with the lower housing 20 only at the shock-absorbing members 24, the lateral end portion or portions 45, 46 is brought into contact with a corresponding lateral end portion or portions in the upper housing 10, thereby preventing contact of any input key with the transparent plate of the display screen.

FIGS. 4A and 4B are cross-sectional views taken along line A-A and line B-B in FIG. 3A, respectively. As seen in FIG. 4A, the inner major surface of the lower housing 20 is lower at the first area than at the second area 53, to form the recess 44 at the first area. The keytop 51 of each of the input keys in the first area, namely, the alphanumeric keys, is convex outward. The keytop 52 of each of the input keys in the second area is substantially flat. The highest points of the keytops 51, 52 of the input keys of both the first and second groups are substantially flush with the portion 53 of the inner major surface at the second area. Accordingly, the input keys in the first area protrude from the inner major surface of the lower housing 20, so that a user feels convexity of the individual input keys when manipulating the input keys with a finger.

There will be described reasons for sectioning the inner major surface of the lower housing 20 into the first area and the second area, and lowering the inner major surface only at the first area.

The input keys of the first group disposed in the first area are a so-called "tenkey", and associated with input of telephone number, text of mail message or note, and others. In particular, when a text is inputted, a finger of the user moves in every direction across the first area. On the other hand, the input keys in the second area are associated with selection and control of various functions of the terminal, and less frequently used than the tenkey. In this way, the intended purpose or function is different between the input keys of the first group and those of the second group, and thus visually and sensuously differentiating the first group from the second group facilitates distinguishing between the two areas when the terminal is used.

An antenna of this mobile phone terminal is incorporated inside the terminal, and for this and other reasons, the upper and lower housings is made of resin. Hence, when a large external force is imposed on the terminal in the folded state, the housings made of resin may deform so that a central portion of the upper housing and that of the lower housing, which are remote from the connecting portion 14 and the shock-absorbing members 24, are made close to each other in some situations. However, even in the event of contact of the keytop of any input key with the display screen of the display 32 due to this deformation, the contact is made substantially at a point since the input key is convex outward. This makes the display screen less suffering from damage or contamination, and accordingly less susceptible to defacement. Thus, the convex shape of the keytop enhances the usability as well as prevents the defacement of the display screen.

On the other hand, there is no possibility that the upper and lower housings 10, 20 contact each other at the second area that is relatively near the connecting portion, when the terminal receives an external force. Hence, the keytop of each input key of the second group may be substantially flat, as seen in the past. The input keys of the second group are used less frequently than the tenkey (i.e., the input keys of the first group), and thus the lack of convexity at the input keys of the second group does not much affect the usability adversely.

The following effects are obtained by the present embodiment:

(1) The usability of input keys of a particular group that are arranged in an area in an inner major surface of a lower housing of a terminal can be enhanced without increasing the thickness of the terminal as folded, by increasing the level difference between the keytop of each of the input keys of the group and the inner major surface, in a manner such that the inner major surface is lowered relatively to the input keys around the input keys.

(2) The usability of the input keys of the particular group is enhanced since the keytop of each of the input keys of the group is convex outward to facilitate quickly sensing the individual input keys with a finger to properly position the finger as intended, during a mail message is prepared. Consequently, the usability of the terminal is enhanced, and a false operation of the terminal is prevented.

(3) Damage and defacement of the display screen are prevented by the suitably determined height and shape of the keytops and other parts and elements, even where an external pressure is imposed on a terminal as folded and being carried in a pocket of clothing or a bag, e.g., where a user sits on a chair with a terminal kept in a pocket of his/her trousers.

(4) An additional component is not required, and an increase in the cost due to addition of a mechanism is not involved.

Although there has been described one embodiment of the invention, the invention may be embodied with various changes and modifications other than those mentioned above. For instance, the details of the mobile phone terminal shown in FIG. 1, such as employment, shape, and position of each of the elements shown in FIG. 1, is not particularly relevant to the principle of the invention, but the mobile phone terminal has been described as a specific example of a fold-type mobile terminal apparatus according to the invention. The specific figures in the above description are also presented as examples and the invention is not limited to those figures.

Although in the above-described embodiment the connecting portion takes the form of a hinge arrangement, the connecting portion may be otherwise. For instance, the invention is applicable to a type of mobile terminal apparatus where an upper housing is linearly or rotationally slidable relatively to a lower housing, or another type of mobile terminal apparatus where a connecting portion connects an upper housing with the lower housing such that the upper housing can rotatable relatively to the lower housing around two axes.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile terminal apparatus, comprising:
   an upper housing in which a display portion having a display screen is disposed;
   a lower housing having an inner major surface in which an operating portion including a plurality of input keys is disposed; and
   a connecting portion which connects the upper housing with the lower housing such that the upper housing and the lower housing are turnable away from and toward each other to open and close the apparatus, wherein
   the inner major surface of the lower housing is recessed at an area where input keys of a first group are disposed, so a keytop of each of the input keys of the first group protrudes from the inner major surface, and
   a highest point of the keytop of each of the input keys is substantially flush with a non-recessed portion of the inner major surface when the apparatus is open.

2. The mobile terminal apparatus according to claim 1, wherein the keytop of each of the input keys of the first group is convex.

3. The mobile terminal apparatus according to claim 1, wherein the inner major surface of the lower housing in which the operating portion is disposed is sectioned into a first area in which the input keys of the first group are disposed, and a second area constituted by an area other than the first area in the inner major surface, wherein input keys of a second group are disposed, and a level of the inner major surface of the lower housing is higher at the second area than at the first area.

4. The mobile terminal apparatus according to claim 3, wherein a keytop of each of the input keys of the second group is substantially flush with a part of the inner major surface around the input keys of the second group when the apparatus is open.

5. The mobile terminal apparatus according to claim 3 or 4, wherein the mobile terminal apparatus is a mobile phone terminal, and the input keys of the first group include a tenkey while the input keys of the second group include at least an on/off key and a call start key.

6. The mobile terminal apparatus according to claim 3 or 4, wherein the keytop of each of the input keys of the second group is substantially flat.

7. The mobile terminal apparatus according to claim 3 or 4, wherein the input keys of the second group are located closer to the connecting portion than the input keys of the first group.

8. The mobile terminal apparatus according to claim 3 or 4, wherein the inner major surface is configured such that two lateral end portions thereof on opposite sides of the first area are flush with the second area.

9. The mobile terminal apparatus according to claim 1, further comprising a shock-absorbing member disposed at an end portion of a surface of at least one of the lower housing and the upper housing, wherein the surface is to be opposed to the other housing when the apparatus is closed, and the end portion is located on an opposite side of the surface from the connecting portion.

10. The mobile terminal apparatus according to claim 1, wherein the upper and lower housings are made of resin.

11. The mobile terminal apparatus according to claim 1, wherein an antenna is incorporated inside the upper housing or the lower housing.

12. A mobile terminal apparatus, comprising:
   an upper housing in which a display portion is disposed connected to a lower housing in which a plurality of input keys is disposed, wherein,
   when the apparatus is in a closed state and at least one of the upper housing and the lower housing is deformed by an external pressure such that a deformation results in the upper housing contacting the lower housing at a portion other than at a shock-absorbing member, a lateral end portion in the lower housing is brought into contact with a corresponding lateral end portion in the upper housing, thereby preventing contact of any of the input keys with the display portion,
   an inner major surface of the lower housing is recessed at an area where input keys of a first group are disposed, so a keytop of each of the input keys of the first group protrudes from the inner major surface, and
   the inner major surface of the lower housing in which an operating portion is disposed is sectioned into a first area in which the input keys of the first group are disposed and a second area constituted by an area other than the first area in the inner major surface in which input keys of a second group are disposed, and a level of the inner major surface of the lower housing is higher at the second area than at the first area.

13. The mobile terminal apparatus according to claim 12, wherein a keytop of each of the input keys of the second group is substantially flush with a part of the inner major surface around the input keys of the second group.

14. The mobile terminal apparatus according to claim 13, wherein the inner major surface is configured such that two lateral end portions thereof on opposite sides of the first area are flush with the second area.

* * * * *